United States Patent
Dwork et al.

(10) Patent No.: US 7,363,192 B2
(45) Date of Patent: Apr. 22, 2008

(54) NOISY HISTOGRAMS

(75) Inventors: Cynthia Dwork, San Francisco, CA (US); Frank D. McSherry, San Francisco, CA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 11/298,563

(22) Filed: Dec. 9, 2005

(65) Prior Publication Data

US 2007/0136027 A1    Jun. 14, 2007

(51) Int. Cl.
G06F 19/00    (2006.01)

(52) U.S. Cl. .................................... 702/180; 702/179

(58) Field of Classification Search ................ 702/179, 702/180, 69, 74; 382/190, 261; 375/240.6
See application file for complete search history.

(56) References Cited

U.S. PATENT DOCUMENTS 4,141,071 A * 2/1979 Yerkes et al. ................ 700/152

OTHER PUBLICATIONS

Cythia Dwork and Kobbi Nissim; "Privacy-Preserving Datamining on Vertically Partitioned Databases"; 2004, 17 pages.*
Ben-Or, M., et al., "Completeness theorems for non-cryptographic fault-tolerant distributed computation," *ACM*, 1988, 1-10.
Blum, A., et al., "Practical privacy: The SuLQ framework," *PODS*, 2005, 128-138.
Chawla, S., et al., "On the utility of privacy-preserving histograms," *UAI*, 2005, 120-127.
Chawla, S., et al., "Toward privacy in public databases," *Theory of Cryptography Conference*, 2005, 363-385.
Dwork, et al., "Privacy-preserving datamining in vertically partitioned databases," *Crypto*, 2004, 17 pages.
Goldreich, O., et al., "How to play any mental game," *ACM*, 1987, 218-229.
Killian, J., "Secure Computation," *Cryptography Tutorial*, http://www.cs.rutgers.edu/~jkillian/lectures, downloaded from the Internet on Feb. 27, 2006.
U.S. Appl. No. 11/244,800 filed Oct. 6, 2005, Dwork et al.
U.S. Appl. No. 11/291,131 filed Nov. 30, 2005, Dwork et al.
U.S. Appl. No. 11/292,884 filed Dec. 2, 2005, Dwork et al.
U.S. Appl. No. 11/305,800 filed Dec. 16, 2005, Dwork et al.
U.S. Appl. No. 11/316,761 filed Dec. 22, 2005, Dwork et al.

* cited by examiner

*Primary Examiner*—Bryan Bui
(74) *Attorney, Agent, or Firm*—Woodcock Washburn LLP

(57) ABSTRACT

A histogram can be generated and displayed with noisy category values, where the noise values are selected from a noise distribution that is calculated using a histogram diameter. The noise values are combined with histogram category values, thereby producing noisy histogram category values that do not reveal information about the contributors.

14 Claims, 6 Drawing Sheets

Exponential Distribution

Normal Distribution

Hybrid Distribution

NOISY HISTOGRAMS

BACKGROUND

Data collection is used to gather information for a wide variety of academic, business, and government purposes. For example, data collection is necessary for sociological studies, market research, and in the census. To maximize the utility of collected data, all data can be amassed and made available for analysis without any privacy controls. Of course, most people and organizations ("privacy principals") are unwilling to disclose all data, especially in modern times when data is easily exchanged and could fall into the wrong hands. Privacy guarantees can improve the willingness of privacy principals to contribute their data, as well as reduce fraud, identity theft, extortion, and other problems that can arise from sharing data without adequate privacy protection.

A method for preserving privacy is to compute collective results of queries performed over collected data, and disclose such collective results without disclosing the inputs of the participating privacy principals. For example, a medical database might be queried to determine how many people in the database are HIV positive. The total number of people that are HIV positive can be disclosed without disclosing the names of the individuals that are HIV positive. Useful data is thus extracted while ostensibly preserving the privacy of the principals to some extent.

However, as one might imagine, clever adversaries might apply a variety of techniques to predict or narrow down the set of individuals from the medical database who are likely to be HIV positive. For example, an adversary might run another query that asks how many people both have HIV and are not named John Smith. The adversary may then subtract the second query output from the first, and thereby learn the HIV status of John Smith without ever directly asking the database for a name of a privacy principal. With sensitive data, it is useful to provide verifiable privacy guarantees. For example, it would be useful to verifiably guarantee that nothing more can be gleaned about any specific privacy principal than was known at the outset.

Adding noise to a query output can enhance the privacy of the principals. Using the example above, some random number might be added to the disclosed number of HIV positive principals. The noise will decrease the accuracy of the disclosed output, but the corresponding gain in privacy may warrant this loss. The concept of adding noise to a query result to preserve the privacy of the principals is discussed in U.S. patent application Ser. No. 11/244,800, filed Oct. 6, 2005; U.S. patent application Ser. No. 11/305, 800, U.S. patent application Ser. No. 11/292,884, U.S. patent application Ser. No. 11/316,791, U.S. patent application Ser. No. 11/291,131, and U.S. patent application Ser. No. 11/316, 761. Some additional work on privacy includes Chawla, Dwork, McSherry, Smith, and Wee, "Toward Privacy in Public Databases," Theory of Cryptography Conference, 2005; Dwork, Nissim, "Privacy-Preserving Data Mining in Vertically Partitioned Databases," Crypto 2004; Blum, Dwork, McSherry, Nissim, "Practical Privacy: The SuLQ Framework," PODS 2005; and Chawla, Dwork, McSherry, Talwar, "On the Utility of Privacy-Preserving Histograms," UAI 2005.

Even when noise is added to results, adversaries may be able to glean information about privacy principals by running a multitude of queries and comparing the outputs. This problem can be addressed by requiring that each of at most T queries of the data be a simple summation of the result of applying a fixed function to the data pertaining to each privacy principal, and queries beyond the $T^{th}$ are not answered.

In addition to the above, so-called secure function evaluation techniques, developed in the 1980's, were a major advance in the ability of people, organizations, or other entities ("privacy principals") to compute a collective result without disclosing their individual data to one another. Secure function evaluation is explored in a variety of academic publications. For a background discussion of secure function evaluation, please refer to Ben-Or, Goldwasser, and Wigderson, "Completeness Theorems for Non-Cryptographic Fault-Tolerant Distributed Computation" (1988), and/or Goldreich, Micali, and Wigderson, "How to Play Any Mental Game" (1987).

SUMMARY

The present invention provides systems and methods for generating and displaying a histogram while preserving privacy of those contributing data used in the histogram. In general, a histogram can be generated and displayed with noisy category values, where the noise values are selected from a noise distribution that is calculated using a histogram diameter and a privacy parameter. The noise values are combined with histogram category values, thereby producing noisy histogram category values that do not reveal information about the contributors.

BRIEF DESCRIPTION OF THE DRAWINGS

The systems and methods for generating and displaying noisy histograms in accordance with the present invention are further described with reference to the accompanying drawings in which.

DETAILED DESCRIPTION

Figure 1:
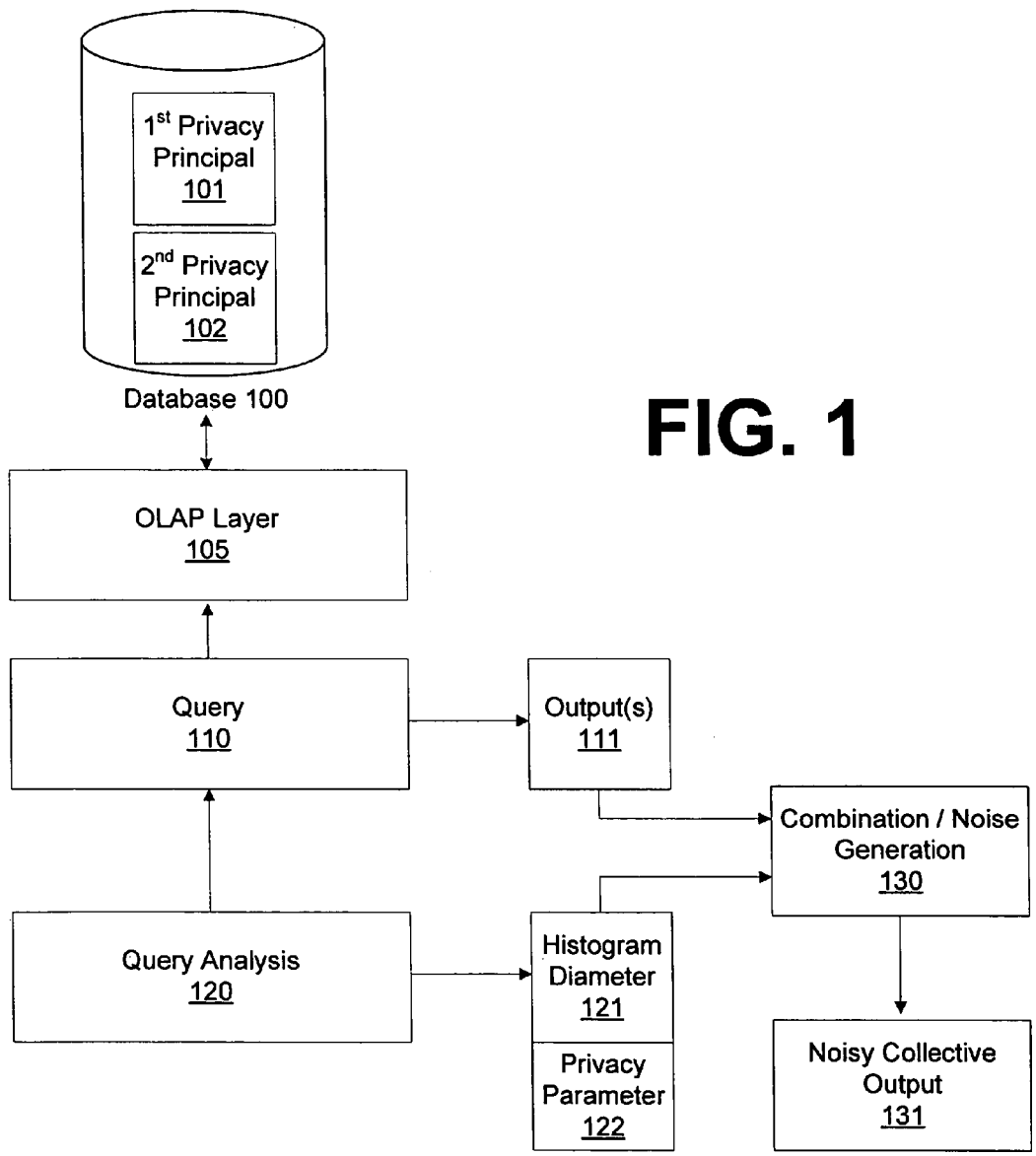
FIG. 1 illustrates a system for generating a noisy collective output 131, which can be a noisy histogram, wherein said system preserves privacy of data used in calculating said noisy histogram.

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

Aspects of the invention can be understood through analysis of U.S. patent application Ser. No. 11/291,131, U.S. patent application Ser. No. 11/292,884, and U.S. patent application Ser. No. 11/305,800, which are hereby incorporated by reference in their entirety. This description begins by illustrating the concept of adding appropriately scaled noise to database outputs, then introduces exemplary systems and methods for generating noisy histograms.

A query is a function applied to data. In a simple case, a query function may ask a database, for each person (privacy principal) in the database, does the person have blue eyes? If yes, the function returns a 1 (one) and if no, it returns a 0 (zero). A collective output may then be calculated by summing the individual outputs.

Extending the eye color example, imagine a database that contains eye color data for a plurality of people. Each person may have just one eye color, brown, blue, or green. A hypothetical attacker determined to find the true eye color of a particular person but that only has access to collective outputs from the database might see a collective output of a brown eye query and find that 82 people have brown eyes.

Next, two privacy principals, including the individual the attacker is interested in, leave the database. The attacker views the collective outputs of a subsequent query, finding that 81 people have brown eyes. Now the attacker knows there is some likely chance that the individual has brown eyes. If the attacker further knows that one of the departing privacy principals has blue eyes, he learns with certainty that the other has brown eyes.

When random noise is added to the collective outputs, the attacker's task becomes more difficult. However, noise also decreases the accuracy and therefore utility of the output. Noise is some undisclosed value that is added to an output, thereby generating a noisy output. Noise should ideally be sufficient to stymie the attacker but not so great that it overly impacts output utility.

The exact value of noise added to a particular collective output cannot be disclosed—if it were, there would be no point in adding noise. However, a distribution that describes the likelihood of possible noise values can be disclosed, so that all people viewing the collective outputs are aware of the likelihood that the noisy collective output is close to the actual collective output.

Figure 2A:
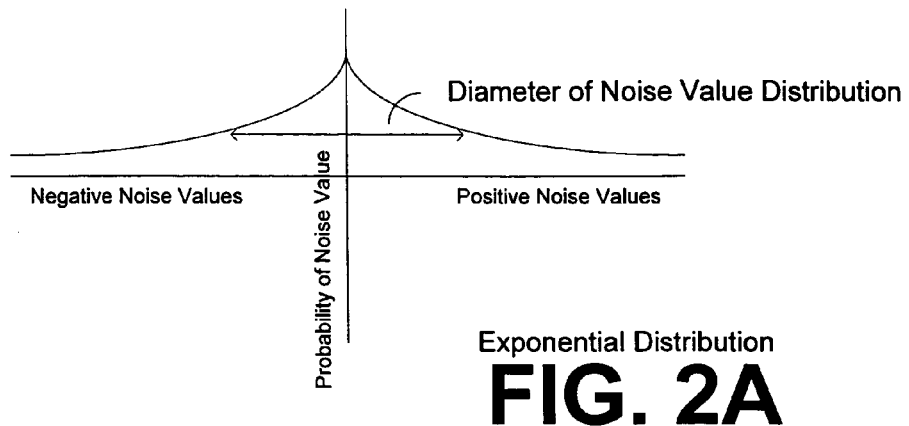
FIG. 2A illustrates an exponential distribution of possible noise values to add to a collective output.
Figure 2B:
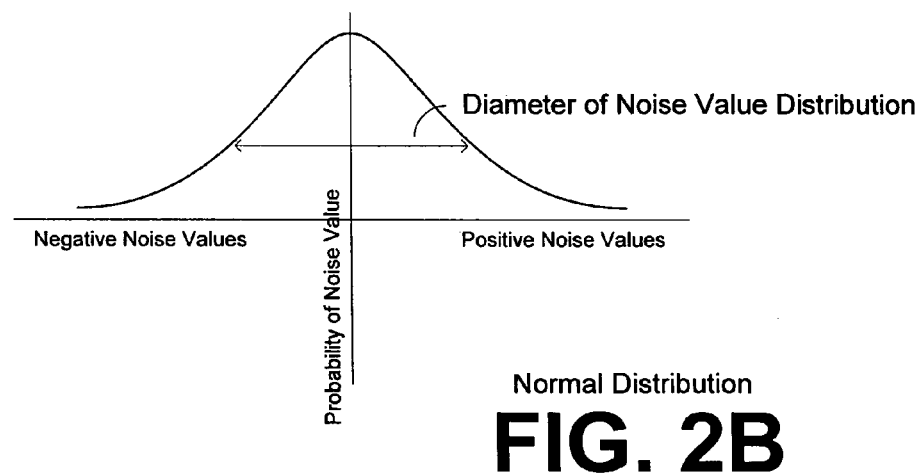
FIG. 2B illustrates a normal distribution of possible noise values to add to a collective output.
Figure 2C:
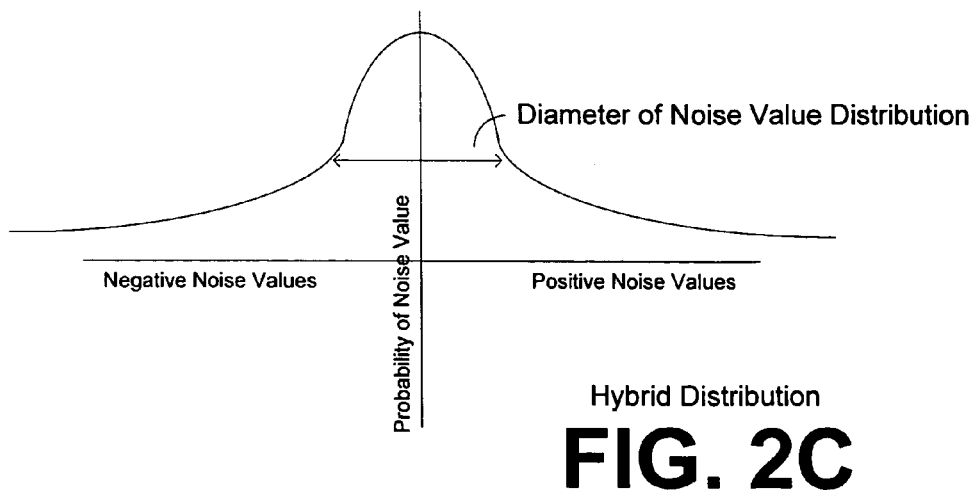
FIG. 2C illustrates a hybrid distribution of possible noise values to add to a collective output.

What noise distributions are appropriate? In the eye color example above, imagine a corresponding noise distribution makes it equally likely that a noise value anywhere from −100 (negative one hundred) and 100 (one hundred) is added. Noise values with an absolute value above 100 are very unlikely. Such a distribution would surely protect privacy, but in this case at an unacceptably high utility cost. If the true number of people with brown eyes is 82 (eighty-two), but the noisy output is equally likely to be anywhere from −18 to 182, those wanting some realistic prediction of how many people have brown eyes will not be satisfied. Note that there are a number of other reasons this type of noise distribution is undesirable. For example, if all noise values in the range [−100, 100] are equally likely, and noise value probability plummets down outside this range, the adversary would know upon seeing an output of −100 (negative one hundred) that the original value was 0 (zero), and not 1 (one). Distributions such as those of FIG. 2A-2C are preferable because they have the property that 0 (zero) is the most likely, while the likelihood of other noise values decreases with their distance from 0 (zero).

Conversely, if the noise distribution makes it equally likely that a noise value between −0.001 (negative one one thousandth) and 0.001 (one one thousandth) will be added to the collective result, but very unlikely that noise with an absolute value beyond 0.001 will be added, then the noise distribution will lead to very high output utility, but at the expense of privacy. In this case, the privacy principals will have no meaningful additional privacy due to noise, because the attacker can simply round to the nearest whole number. If the disclosed noisy output is 81.999 people with brown eyes, the attacker knows that the actual collective output was probably 82.

To determine an appropriate noise distribution, we propose evaluating a query to determine the maximum difference in the collective output attributable to a particular privacy principal. We refer to this maximum difference as the diameter of a query. In the brown eye query example above, the diameter is 1 (one). Either a principal has brown eyes, in which case she increases the output of a brown eye query by 1 (one), or she does not have brown eyes, in which case she does not increase the collective output of a brown eye query at all.

Thus, an exemplary appropriate noise distribution can comprise a high likelihood that a noise value of −1 (negative one), 0 (zero), or 1 (one) will be added to the collective result, a somewhat lower likelihood of a noise value with an absolute value of 2 (two), still less likelihood of noise with an absolute value of 3 (three), and so forth. The diameter of a query can thus be used to determine an appropriate distribution of noise values.

Histograms present a special case which may be considered a special type of query in which query diameter is easily determined. In statistics, a histogram is a graphical display of tabulated frequencies. That is, a histogram is the graphical version of a table which shows what proportion of cases fall into each of several or many specified categories. The categories are usually specified as nonoverlapping intervals of some variable. In a more general mathematical sense, a histogram is simply a mapping that counts the number of observations that fall into various disjoint categories (known as bins), whereas the graph of a histogram, is merely one way to represent a histogram.

Histograms present a situation in which query diameter is easily determined. Diameter for a histogram is the largest number of cells that one privacy principal can participate in. In other words, with histograms one is capable of greatly simplifying or removing query evaluation procedures discussed in U.S. patent application Ser. No. 11/291,131, and in U.S. patent application Ser. No. 11/305,800.

Where diameter is computed as described in U.S. patent application Ser. No. 11/291,131, diameter of a histogram is 2 (two). When computed as a differential privacy value as described in U.S. patent application Ser. No. 11/305,800, diameter of a histogram is 1 (one). Beyond choosing between 1 and 2, it is unnecessary to determine the diameter or database sensitivity of histograms. Because they are of special form, we know the answer. Thus, the term "histogram diameter" as used herein will refer to either 1 or 2, depending on whether the type of privacy desired is differential or not.

FIG. 1 illustrates a system for adding an appropriately scaled amount of noise to a histogram. FIG. 1 presents a system for generating a noisy collective output 131, such as a noisy histogram, wherein said system preserves privacy of data used in calculating said noisy histogram 131. A database 100 is configured to store data associated with a plurality of privacy principals 101, 102 and configured with a query mechanism 110 to run queries on said data to obtain a plurality of outputs 111. The database 100 may be configured with an Online Analytical Processing (OLAP) Layer 105. Outputs 111 can be combined to produce a collective output. In FIG. 1, output 111 combination could occur, for example, in a noise generation mechanism 130 that both combines outputs 111 and calculates an amount of noise to add to the combined outputs, then reveals a noisy collective output 131.

A database 100 is a collection of data, typically describing the activities of one or more related organizations, people, or other entities referred to herein as privacy principals. For example, a university database might contain information about entities, such as students, faculty, courses, and classrooms, and relationships between entities, such as student enrollment in courses, faculty teaching courses, and the use of rooms for courses. A database management system, or DBMS, is software designed to assist in maintaining and utilizing large collections of data. For the purpose of this document, however, the term "database," or "database server" refers to either or both of a collection of data and DBMS software. Thus, database 100 illustrates a database server comprising both collections of data and DBMS. Note that as such database 100 may include the various other elements presented in FIG. 1 which are illustrated separately to clearly suggest the operation of the invention.

Various DBMS products, e.g. MICROSOFT SQL SERVER®, IBM DB2®, ORACLE DATABASE®, and SYBASE IQ® have greatly extended the capabilities of databases. Databases can store a wide variety of data types, such as images and text, and can perform complex queries on stored data. Specialized systems have been developed by numerous vendors for creating data warehouses, consolidating data from several databases, and for carrying out specialized analysis. All such products and database configurations are suitable for use in connection with the systems and methods herein.

Query analysis mechanism 120 can be adapted to determine whether the query represents a histogram, and if so, can select a histogram diameter. Noise generation mechanism 130 can calculate, using said histogram diameter 121 and privacy parameter 122 a distribution of possible noise values, e.g. a distribution such as those displayed in FIGS. 2A-2C. Noise generation mechanism 130 can select from the noise distribution a noise value to add to the output histogram data 111.

Query mechanism 110 can perform any desired queries over data in databases. Queries can be simple or complex, and can generate single outputs or multiple outputs. Also, a privacy principal can be any defined entity or group of entities.

The system of FIG. 1 further comprises a noise generation mechanism 130. This mechanism may include a variety of functions, which may be outsourced to individual components or conducted by 130 as shown. Noise generation mechanism 130 calculates, using said diameter 121, a distribution of possible noise values to add to a collective output. The equations illustrated above provide exemplary approaches to calculating noise distributions. Exemplary noise distributions are further illustrated in FIG. 2A-2C.

In some embodiments it is beneficial to equip database 100 with an OLAP layer 105. OLAP is an approach to quickly provide the answer to complex analytical queries. It is part of broader business intelligence category which also includes Extract Transform Load (ETL), relational reporting and data mining. The typical applications of OLAP are in business reporting for sales, marketing, management reporting, business performance management (BPM), budgeting and forecasting, financial reporting and similar areas.

In general, databases configured for OLAP employ a multidimensional data model, allowing for complex analytical and ad-hoc queries with a rapid execution time. OLAP takes a snapshot of a relational database and restructures it into dimensional data. The queries can then be run against this. It has been claimed that for complex queries OLAP can produce an answer in around 0.1% of the time for the same query on relational data.

There are at least three types of OLAP and 105 may be configured to use any of them. The three types are known to those of skill in the art as Multidimensional OLAP (MOLAP), Relational OLAP (ROLAP), and Hybrid OLAP (HOLAP). MOLAP is the 'classic' form of OLAP and is sometimes referred to as just OLAP.

Well known OLAP products include MICROSOFT® Analysis Services, IBM® DB2 Cube Views, SAP® BW, INFORMATION BUILDERS® WebFOCUS, TM1®, ESSBASE®, MONDRIAN® and products from SAS INSTITUTE®, BRIO®, BUSINESS OBJECTS®, COGNOS®, MICROSTRATEGY®, SAGENT®, CONTOUR COMPONENTS®, AND HOLOS®. There are also some open source OLAP offerings, for example PALO® and the java based MONDRIAN®.

A system such as that illustrated in FIG. 1 can be used to protect the privacy of any types of data. For example, the data may be medical information, and the privacy principals may be people. The data may also comprise information submitted to a government agency, such as the Internal Revenue Service (IRS), wherein the privacy principals could be private individuals, companies, and/or other organizations. The data could be transactions data, comprising for example information regarding customer interactions with a website, a database, a customer service department, sales department, and the like.

Histogram diameter need not be the only variable in shaping a noise distribution. Another variable, referred to herein as epsilon, is a privacy parameter that may be used to increase or decrease the amount of privacy that is ensured. When epsilon is used to widen the distribution of possible noise values, it enhances privacy beyond the amount that would be ensured by using diameter alone in a particular distribution equation. Conversely, if epsilon is used to narrow the distribution, it decreases privacy from what would be obtained using diameter alone. Thus, epsilon values can represent an amount of enhanced privacy. The extent to which epsilon impacts privacy can be tailored by the distribution equation that is selected.

Preferred embodiments will therefore utilize a privacy parameter, as well as a histogram diameter, to generate a noise distribution. Embodiments that do not use a privacy parameter will effectively set epsilon to 1 (one) which corresponds to some amount of privacy loss that may be more or less than desired in the particular situation.

FIG. 2A-2C depict exemplary noise distributions with noise values along an x-axis, and probabilities associated with such noise values on the y-axis. Thus, a noise value on the x-axis corresponding to a high value on the y-axis has a high probability of being selected. The illustrated distributions all share a beneficial feature of decreasing the probability a given noise value as its absolute value increases. This allows noisy outputs to nonetheless be useful, because the probability of an excessively high noise value becomes remote.

FIG. 2A illustrates an exponential distribution, as will be recognized by those of skill in mathematics. FIG. 2B illustrates a normal distribution. FIG. 2C represents a hybrid distribution. The hybrid distribution of FIG. 2C is a normal and exponential distribution, such that a normal distribution defines a portion of the distribution comprising the most probable noise values, i.e. those with a higher y-axis value, and an exponential distribution defines a portion of the distribution comprising the least probable noise values, i.e. those with low y-axis values, corresponding to larger absolute values on the x-axis.

A diameter measurement and privacy parameter can be used in calculating each of the distributions in FIG. 2A-2C. The exemplary equations provided below are satisfactory, and those of skill in the art will be able to construct an infinite variety of distributions that successfully utilize a diameter measurement to create a satisfactory noise distribution. For example, an infinite number of small modifications to the distributions depicted in FIG. 2A-2C are possible.

Knowing the histogram diameter of a function f with respect to a principal p, we can ensure a certain degree of privacy simply by choosing to add appropriately distributed noise to the answer f(x) before returning it. Two examples of noise distribution equations include:

noise~exp(-\epsilon||x||/diam1(f,p)) //"exponential"
noise—see FIG. 2A.

noise~exp(-\epsilon||x|^2/diam2(f,p)) //"normal"
noise—see FIG. 2B.

Here \epsilon is a privacy parameter that determines an amount of privacy that is ensured. Note that in this embodiment, an epsilon of zero will correspond to zero privacy loss, but will also render the database useless because the amount of added noise becomes infinite.

Figure 3:
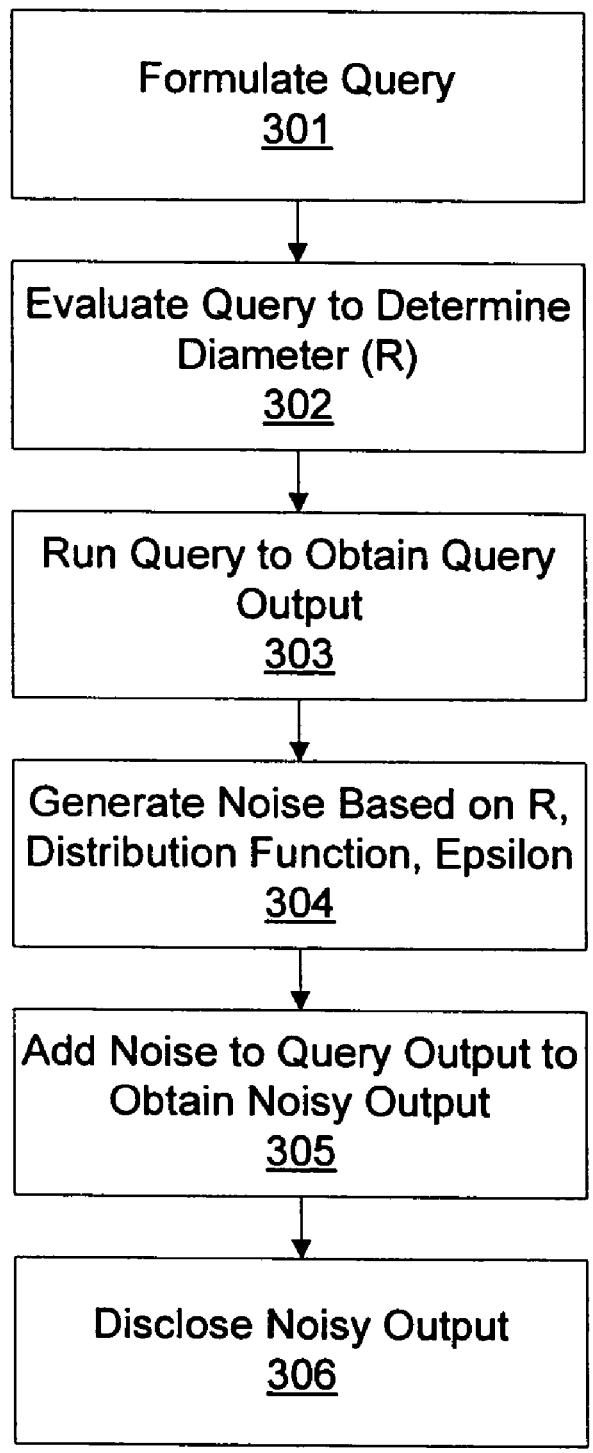
FIG. 3 illustrates a method for preserving privacy of data used in calculating an output.

With reference to FIG. 3, a method for preserving privacy of data used in calculating an output is illustrated. The method comprises first formulating whatever query is to be run against data in a database 301. Next, the query can be evaluated to determine a diameter (represented by the letter R) 302. If the query represents a histogram, the diameter will be a histogram diameter. The query can be performed on data associated with a plurality of privacy principals to obtain a plurality of outputs, and said plurality of outputs can be combined to produce a collective output.

The query can be run in step 303, or this step may be postponed until after calculating an appropriate noise distribution in step 304. Calculating an appropriate noise distribution 304 comprises calculating using said histogram diameter a distribution of possible noise values to add to said collective output. The calculation may also make use of a privacy parameter that corresponds to an amount of privacy that is ensured. The calculation may contemplate any type of distribution curves, for example the exponential distribution in FIG. 2A, the normal distribution in FIG. 2B, or a hybrid distribution such as that of FIG. 2C.

Once a query is performed on said data associated with a plurality of privacy principals, the collective output from the query can be calculated, and a noise value from the noise distribution can be added to the collective output to produce a noisy collective output 305. Finally, the collective noisy histogram output can be disclosed 306, as can the noise distribution. See FIG. 5 for an exemplary histogram output.

One interesting aspect of the invention is that it permits a useful backwards operation in which, for a given query diameter and a known noise distribution, the value of the privacy parameter epsilon can be determined. Thus, systems using the invention that disclose a query and a noise distribution also verifiably disclose the value of the privacy parameter that was used. Privacy principals can thus be informed or calculate for themselves the degree of privacy that is being used with their data.

Figure 4:
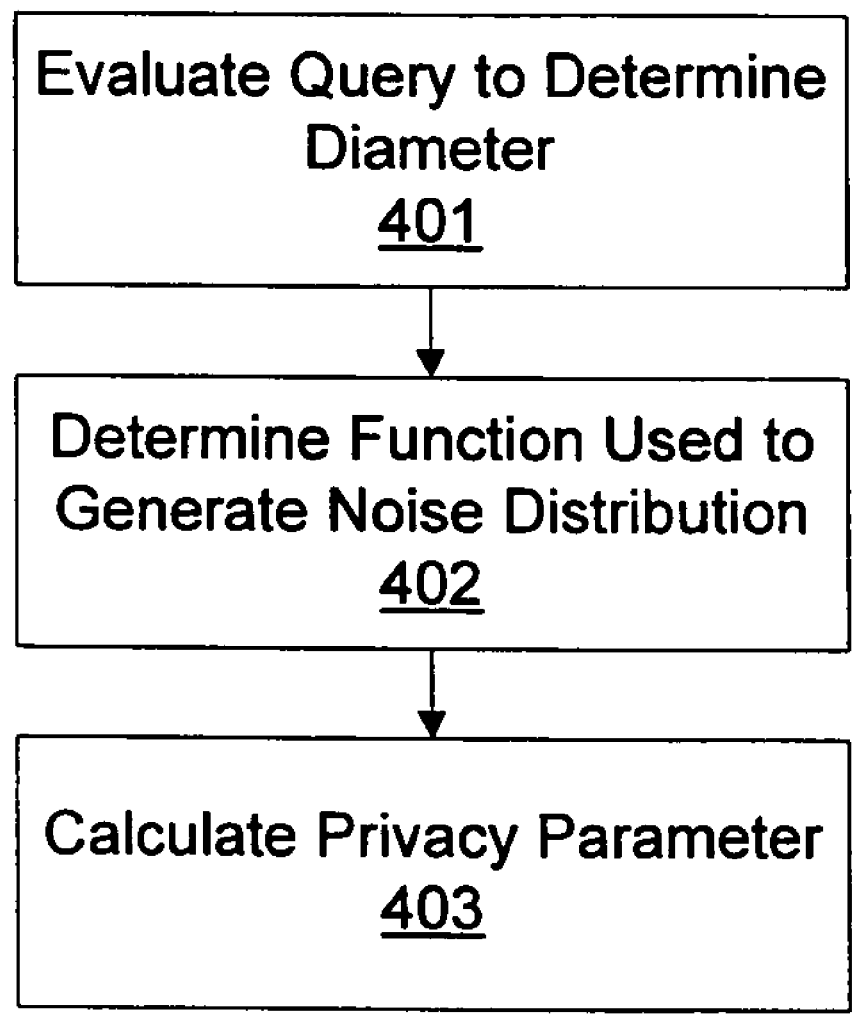
FIG. 4 illustrates a method for determining an amount of privacy guaranteed to privacy principals supplying data, wherein said data is used in calculating a collective noisy output.

A privacy principal that wished to calculate the privacy parameter that is being used with her data might carry out a method such as that illustrated in FIG. 4. Such a method is for determining an amount of privacy guaranteed to privacy principals supplying data, wherein said data is used in calculating a collective noisy output. The method comprises determining a histogram diameter 401. Next, determine the distribution function that was used to generate a noise distribution 402. In the examples provided herein the distribution function has two variables: histogram diameter and epsilon, i.e. a privacy parameter corresponding to an amount of guaranteed privacy. If the distribution function and the diameter are known, epsilon can be calculated 403.

Figure 5:
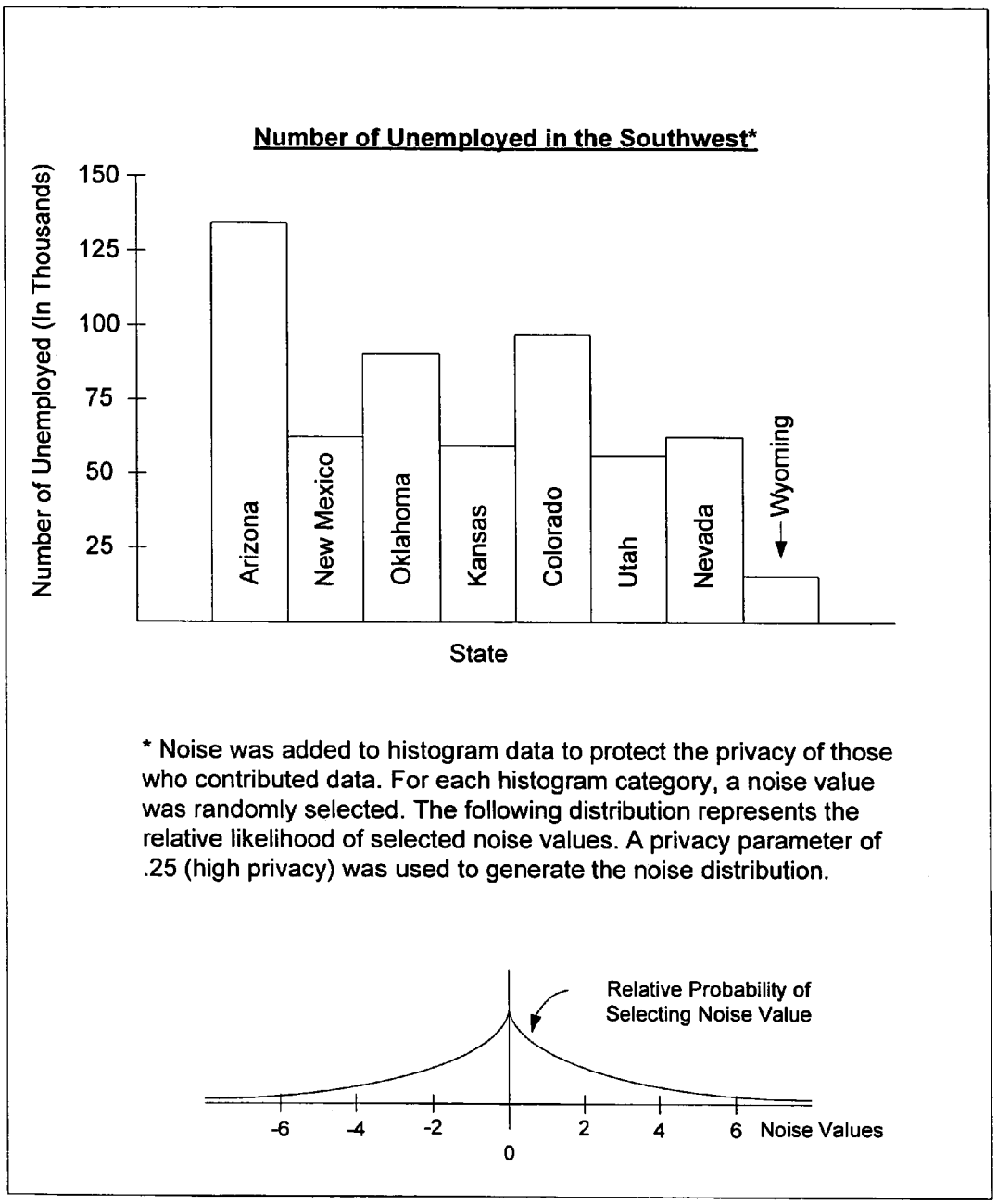
FIG. 5 illustrates displaying a noisy histogram.
Figure 6:
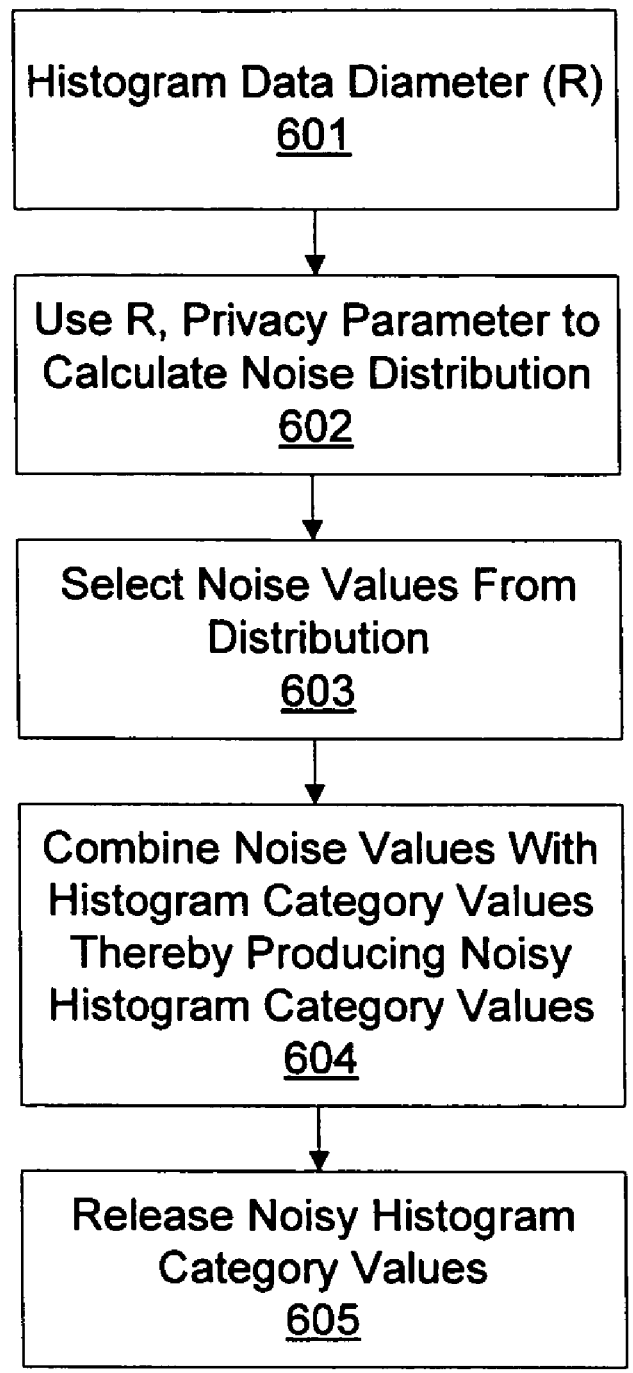
FIG. 6 illustrates a method for generating a noisy histogram.

Systems and methods for generating and displaying noisy histograms will now be disclosed in connection with FIG. 5-FIG. 6.

FIG. 5 presents an exemplary graphical display of a histogram, said histogram comprising a plurality of noisy histogram category values. Noisy histogram category values in FIG. 5 are associated with the number of unemployed in each state in the Southwest. That is, instead of the actual number of unemployed, noisy category values are displayed, wherein a noise value is selected from a distribution of noise values such as the distribution illustrated at the bottom of FIG. 5.

The graphical display at the top of FIG. 5 could just as well be a table of states and numbers of unemployed, or any other histogram presentation of the data. The distribution at the bottom of FIG. 5 is calculated using at least in part a histogram diameter. This example provides a situation where due to the use of the diameter measurement to calculate noise, the likely amount of noise (around plus or minus 2) is very small in relation to the histogram category values (around fifty to one hundred thousand). Such a situation provides very high noisy output utility while also giving meaningful privacy guarantees.

The distribution at the bottom of FIG. 5 may also be calculated using a privacy parameter that corresponds to an amount of privacy that is ensured. The privacy parameter may also be published, as shown in FIG. 5. Publishing epsilon demonstrates a measure of the amount of guaranteed privacy to those who contributed data. In FIG. 5, the illustrated noise distribution is an exponential distribution, and the privacy principal is a single human.

FIG. 6 discloses a method for generating a histogram comprising calculating a histogram diameter 601. Step 601 comprises calculating a diameter of histogram data as discussed above. Histogram diameter and a privacy parameter can be used in step 602 in calculating a distribution of possible noise values to combine with histogram category values. Step 603 comprises selecting a noise value from the distribution to add to the histogram data. Multiple noise values may be selected for combination with multiple histogram category values. For example, referring back to FIG. 5, a noise value may be selected for Arizona, New Mexico, Texas, and so on. The various noise values may be combined histogram category values, thereby producing noisy histogram category values 604. Finally, the noisy histogram category value can be released 605.

The various systems and methods discussed herein are contemplated to be carried out by one or more computing devices which are, in general, well understood. A computing device typically includes at least some form of computer readable media. Computer readable media can be any available media that can be accessed by the device. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by a device. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

In addition to the specific implementations explicitly set forth herein, other aspects and implementations will be apparent to those skilled in the art from consideration of the specification disclosed herein. It is intended that the specification and illustrated implementations be considered as examples only, with a true scope and spirit of the following claims.

The invention claimed is:

1. A method for generating a histogram, comprising:
    calculating a distribution of noise values using at least a histogram diameter and a privacy parameter, wherein said privacy parameter corresponds to an amount of privacy that is ensured;
    selecting a noise value to add to histogram data, wherein said noise value is selected from said distribution of noise values, and wherein the distribution is a hybrid normal and exponential distribution, such that a normal distribution defines a portion of the distribution comprising the most probable noise values, and an exponential distribution defines a portion of the distribution comprising the least probable noise values;
    combining said noise value with a histogram category value, thereby producing a noisy histogram category value; and
    causing said noisy histogram value to be displayed.

2. The method of claim 1, wherein the histogram data comprises medical information.

3. The method of claim 1, wherein the histogram data comprises information submitted to a government agency.

4. The method of claim 1, wherein the histogram data comprises company resources information.

5. The method of claim 1, wherein the histogram data comprises transaction information.

6. A system for generating a histogram, comprising:
    a database configured to store data associated with a plurality of privacy principals;
    a computer readable medium bearing instructions for selecting a noise value from a distribution of noise values, and adding said noise value to histogram data, thereby producing at least one noisy histogram category value, wherein the distribution of noise values is related to a histogram diameter, and wherein the distribution is a hybrid normal and exponential distribution, such that a normal distribution defines a portion of the distribution comprising the most probable noise values, and an exponential distribution defines a portion of the distribution comprising the least probable noise values; and
    a computer readable medium bearing instructions for causing said noisy histogram category value to be displayed.

7. The system of claim 6, further comprising instructions for identifying a query as for the purpose of generating a histogram.

8. The system of claim 6, further comprising instructions for calculating a distribution of possible noise values that is configured to utilize a privacy parameter, wherein said privacy parameter corresponds to an amount of privacy that is ensured.

9. The system of claim 6, wherein the database comprises an online analytical processing (OLAP) layer.

10. A computer readable storage medium comprising computer executable instructions stored thereon for generating a histogram, said instructions comprising:
    instructions for calculating a distribution of noise values using at least a histogram diameter and a privacy parameter, wherein said privacy parameter corresponds to an amount of privacy that is ensured;
    instructions for selecting a noise value to add to histogram data, wherein said noise value is selected from said distribution of noise values, and wherein the distribution is a hybrid normal and exponential distribution, such that a normal distribution defines a portion of the distribution comprising the most probable noise values, and an exponential distribution defines a portion of the distribution comprising the least probable noise values;
    instructions for combining said noise value with a histogram category value, thereby producing a noisy histogram category value; and
    instructions for causing said noisy histogram value to be displayed.

11. The computer readable medium of claim 10, wherein the histogram data comprises medical information.

12. The computer readable medium of claim 10, wherein the histogram data comprises information submitted to a government agency.

13. The computer readable medium of claim 10, wherein the histogram data comprises company resources information.

14. The computer readable medium of claim 10, wherein the histogram data comprises transaction information.

* * * * *